March 4, 1941. H. J. SMITH 2,233,877
BRAKE
Filed Feb. 12, 1938 3 Sheets-Sheet 1
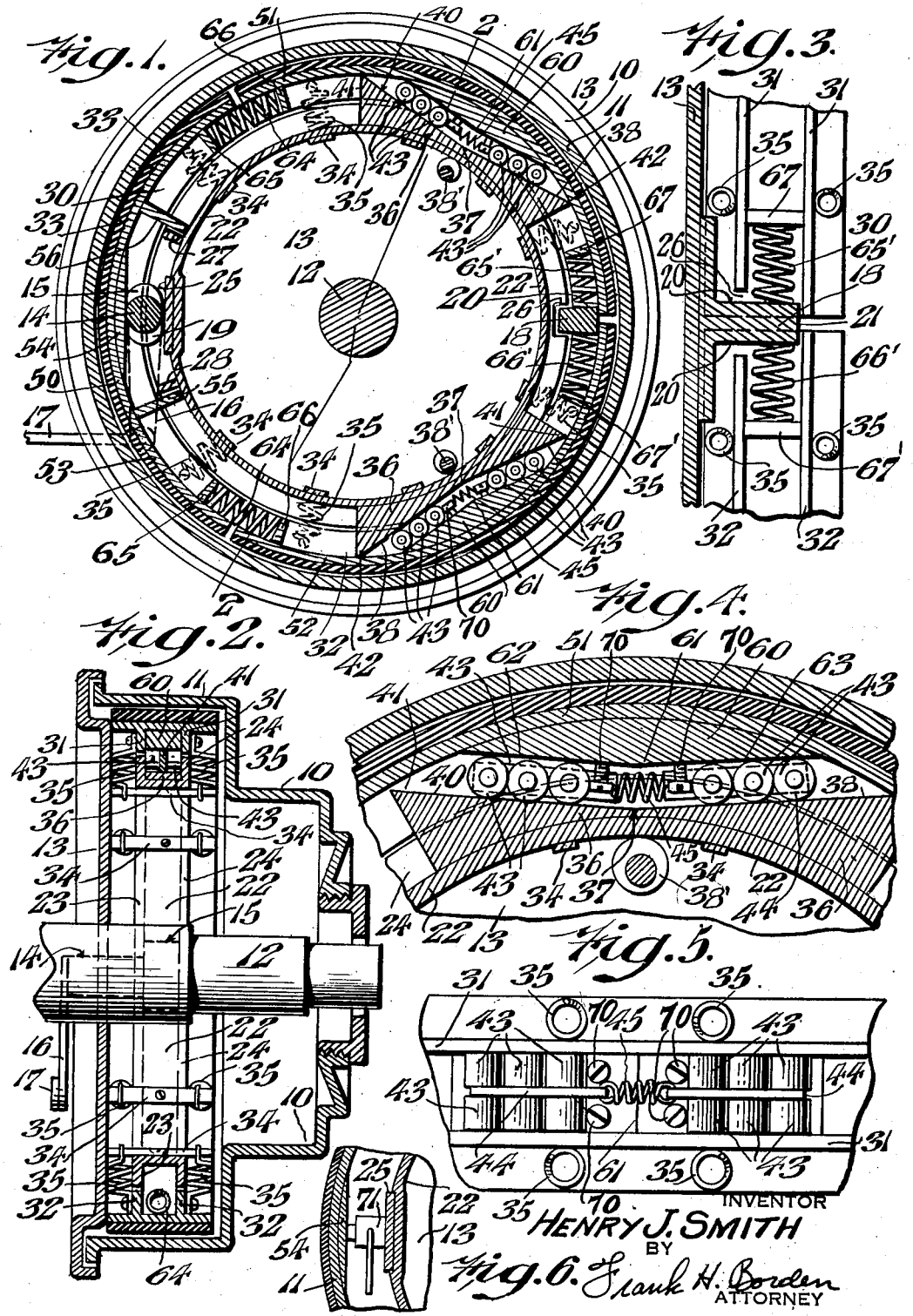
INVENTOR
Henry J. Smith
BY Frank H. Borden
ATTORNEY March 4, 1941.   H. J. SMITH   2,233,877
BRAKE
Filed Feb. 12, 1938   3 Sheets-Sheet 2

INVENTOR
HENRY J. SMITH
BY
Frank H. Boiden
ATTORNEY

March 4, 1941.　　　　　H. J. SMITH　　　　　2,233,877
BRAKE
Filed Feb. 12, 1938　　　　　3 Sheets-Sheet 3
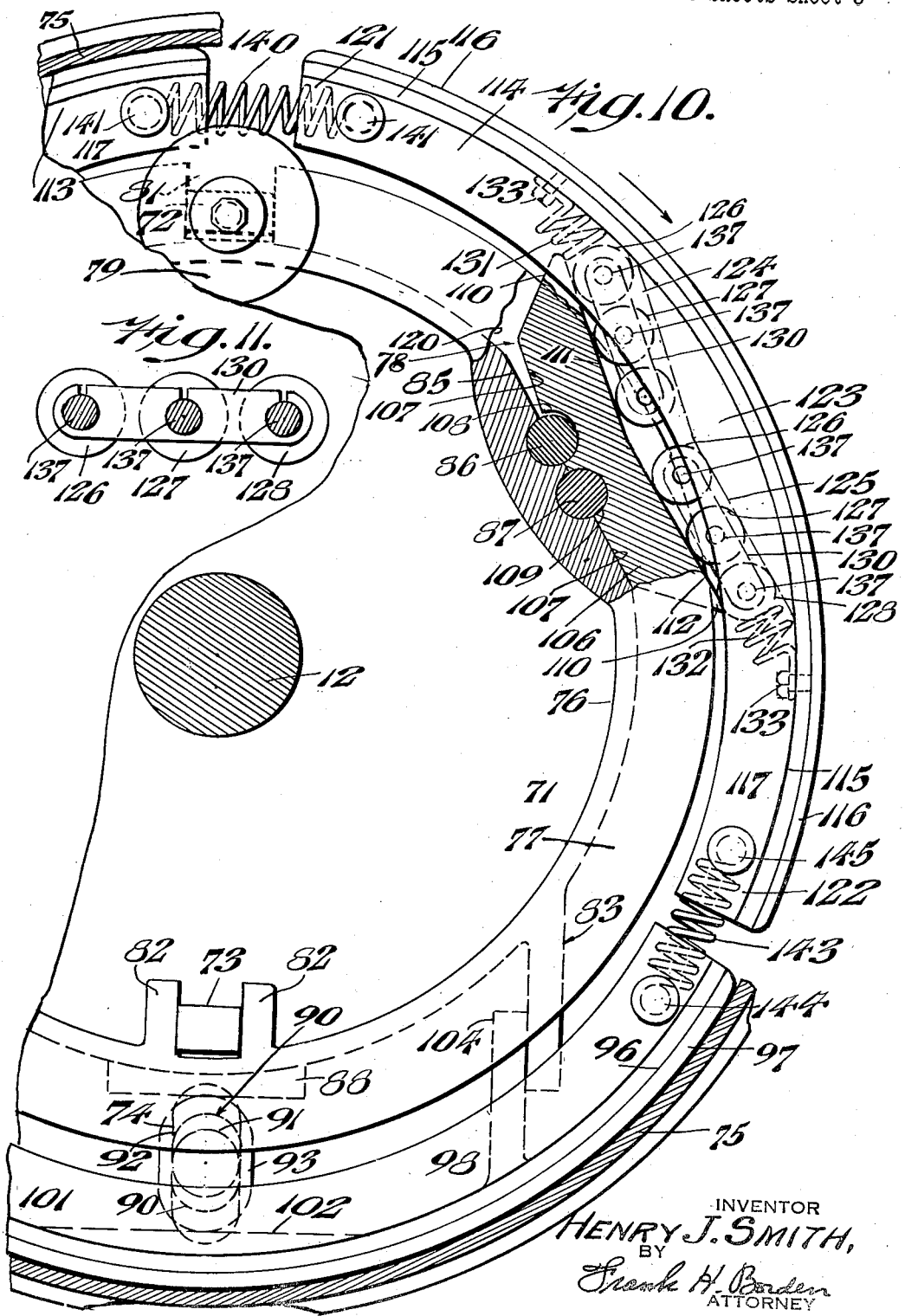

Patented Mar. 4, 1941

2,233,877

UNITED STATES PATENT OFFICE 2,233,877

BRAKE

Henry J. Smith, Philadelphia, Pa., assignor of fifteen per cent to E. Burke Wilford and ten per cent to Graham French, both of Philadelphia, Pa.

Application February 12, 1938, Serial No. 190,183

12 Claims. (Cl. 188—78)

This invention relates to brakes.

It is among the objects of the invention: to provide a brake of efficiency and economy of construction costs; to provide a brake with a maximum of braking surfaces approaching 360° of the drum; to provide a brake with central clearance and freedom from brake or actuating components while securing maximum braking efficiency; to provide a brake which carries the self-energization feature to a desirably efficient braking point while enabling instant release of the brake when the braking demand has passed; to provide a brake available for damping relative rotation between any two elements, whether of automobiles or other automotive equipment, mine cars, machinery and the like; to provide a brake with the same highly efficient braking action in both directions; to provide a brake assembly of shoes and operating mechanism as a removable and replaceable unit whereby relining is facilitated and can be accomplished without disruption of the unit; to provide a brake of high efficiency with extreme simplification and reduction of parts; to provide a brake with parts which are substantial duplicates and are interchangeable so as to facilitate quick assembly and disassembly at low parts and labor costs; to provide an elastic braking unit arranged to adapt itself to drum alignment both peripherally and laterally or transversely; to provide a channeled actuating ring with a plurality of elastically and resiliently joined shoes normally spring pressed toward the ring, with all of the cooperating shoe-extending elements self-contained in the unit of the shoes and ring; to provide a brake shoe support which is always forward of the center of the shoe in either direction of drum travel; to provide a brake which is self-energizing but has each shoe so supported that instant release from locking is secured upon release of braking pressure; and other objects and advantages will become more apparent as the description proceeds.

In the accompanying drawings forming part of this description:

Fig. 1 represents a vertical section through a brake of this invention according to one, but not the preferred, embodiment thereof, perpendicular to the axis of rotation of the drum;

Fig. 2 represents a transverse vertical section in the plane of the axis of the drum of Fig. 1, taken on line 2—2 thereof;

Fig. 3 represents a fragmentary transverse section of the backing plate through an abutment thereon;

Fig. 4 represents a fragmentary enlarged section of the shoe and ring connecting elements shown in Fig. 1;

Fig. 5 represents a fragmentary plan of the ring and the elements mounted thereon shown in Fig. 4;

Fig. 6 represents a fragmentary section of a modified form of actuating element replacing the double cam shown in Fig. 1, and comprising a hydraulic device;

Fig. 10 represents a fragmentary enlarged elevation of the ring and shoe assembly in the position assumed after actuation to contact with a drum turning clockwise, but missing from the figure in the interests of simplicity and understanding.

Fig. 11 represents a longitudinal section through a coupled series of rollers showing the connecting link in elevation after the link and rollers have been secured together.

Figure 7:
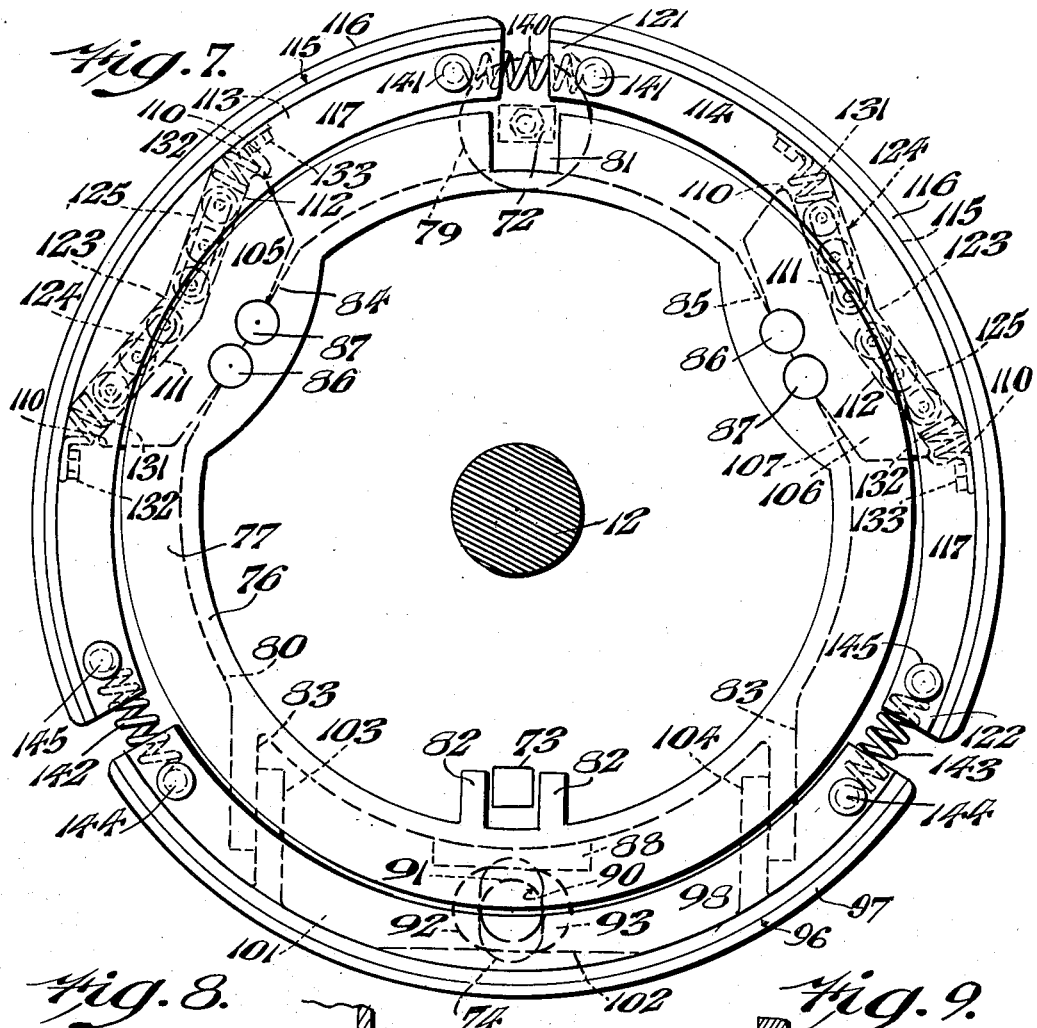
Fig. 7 represents a side elevation of the unitary assembly of actuating ring and shoes removed and replaced as an entity which comprises the preferred form of the invention.
Figure 8:
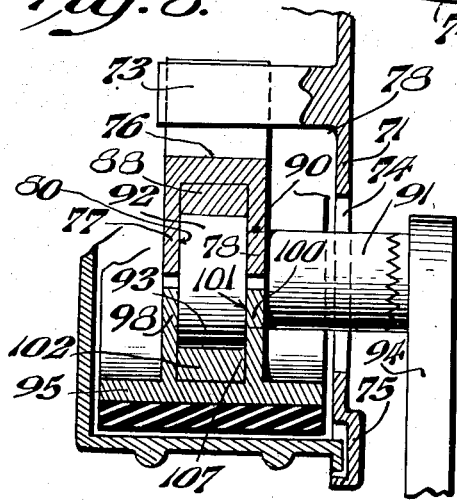
Fig. 8 represents a fragmentary section on an enlarged scale through the ring channel, the actuating cam shown in elevation, and the channeled shoe of Fig. 7, with the stationary backing plate and abutment disclosed in section and partially in elevation.
Figure 9:
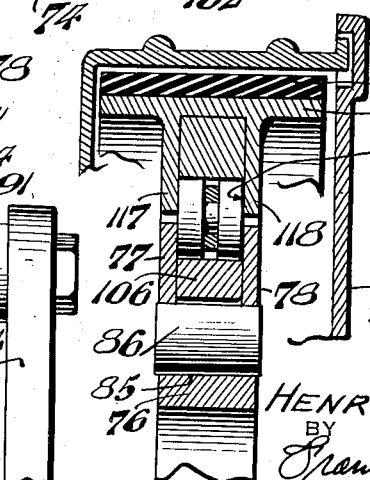
Fig. 9 represents a fragmentary section on an enlarged scale through the ring channel showing the rocking cam therein, the roller guided between the walls of the channel, the shoe and its channel and the fixed cam therein.

The invention of the embodiment shown in Figs. 1 to 6 inclusive will be described in connection with a rotary housing 10 including the brake drum 11 rotatable with the axle 12, for instance, and relative to the fixed plate 13. A shaft 14 having the double cam 15 and 19 on the brake end, is journalled in the plate 13 toward the outer periphery thereof, and has the actuating arm 16 rigidly mounted thereon, to which the operating link 17 is pivoted. The operating mechanism comprised of the cam-shaft and lever arm is purely illustrative and any other conventional or other operating mechanism, such as the hydraulic device 71 of Fig. 6, for instance may be used with both forms of invention disclosed herein.

Mounted on and projecting inwardly of the plate 13, and diametrically opposite to the oscillatible shaft 14, is the rigid angular abutment 18, having a pair of spaced parallel walls 20, extending substantially radially of the axis 12, and a plane edge 21. The abutment is heavy and is, for instance, welded to the plate 13.

A preferably complete and rigid floating ring 22, of any desired contour having a pair of external peripheral rib flanges 23 and 24 is normally disposed in substantially concentric relation to the axle 12 and held between the shaft 14, by a wear plate 25, if desired adjacent to the shaft, an dthe abutment 18, with the slot 26 of the flange or rib 23 straddling the fixed abutment and guided slidably on the parallel surfaces 20 to preclude appreciable angular motion of the ring. Movement of the cam 15 against the wear plate 25 of the floating ring causes a bodily diametric shift of the floating ring to a position of eccentricity without angular position change. The ring is held in parallel spaced relation to plate 13 as by rods 34 mounted on and overhanging each side thereof, to furnish securing points or anchorages for the tensioning springs 35 engaging the respective rods and the brake shoes to be described. At desired intervals the ring is provided with a desired number, preferably two, of the obtuse angled cam elements 36, disposed between the side ribs or walls 23 and 24 but extending radially outwardly beyond the edges of the side walls. Each cam comprises the low point or valley 37, from which the cam surfaces 38 and 40 diverge outwardly to the points 41 and 42. Each double cam 36 has mounted upon it the coupled roller series comprised of the plurality of rollers 43, the spacing guide plates 44, engaging each roller in the series, and the spring device 45, which joins the related pluralities so as to urge them toward convergent movement. The rollers are normally guided between the side walls of the ring, and are usually symmetrically disposed relative to the valley or median line of the double outward cams 36. Suitable adjustable anchor cams 38' are mounted on the backing plate 13 to bear against the inner surface of the ring 22 as to furnish stops in the normally unbraking position of the ring. These are capable of adjustment but during ordinary use are fixed.

The braking elements are comprised of a suitable plurality of shoes, illustratively three in number, respectively 50, 51 and 52, each of approximately 120° of the periphery of the drum, and each having spaced side walls or reinforcing ribs, respectively 30—30, 31—31 and 32—32. Shoe 50 is cam actuated, while shoes 51 and 52 are each both directly radially actuated as well as self-energized, in a novel manner to be described. Shoe 50 having the friction lining 53 has a median chord portion 54 between side walls 30 adjacent to and contacting with the cam shaft 14, in position to be engaged by the cam 19 on shaft 14. The substantially radial fins 55 and 56 between ribs 30—30 extend into the channel between side walls 23 and 24 of the ring 22, in sliding guiding engagement with the transverse webs 27 and 28 of the ring. Relative rotation or angular motion of shoe 50 and the ring 22 is prevented in both directions.

Shoes 51 and 52 are each provided between spaced ribs or walls 31—31 and 32—32 with median obtusely tapered double cams 60 having the ridge lines 61, from which the cam surfaces 62 and 63 diverge rearwardly in substantial parallelism with the respective cam surfaces 40 and 38 of the juxtaposed double cams 36, but in spaced relation and in rolling engagement with each of the sets of rollers 43 in the normal position of the parts. Spacer springs 64 are disposed between the radial webs 65 on shoe 50 and the radial webs 66 on the respective shoes 51 and 52. Spacer springs 65' and 66' are disposed respectively between abutments 67 on shoe 51, and 67' on shoe 52, and faces 20 on abutment 18. Stops 70 on the obtuse servo cams 60, engage between the inner ends of the rollers 43 to limit the motion of the rollers as a substantial unit.

In operation it will be clear that actuation of the link 17, or the like, will turn the cam shaft 14, pushing the ring 22 transversely of the axis 12, toward the abutment 18, through cam 15, while also pushing the lining on shoe 50 into engagement with the rotating drum, and securing a desired frictional effect from such direct unenergized contact with the drum. The bodily shift of the ring pushes the double cam elements outwardly to push the shoes 51 and 52 outwardly until their respective linings will engage the inner surface of the drum. This is of course accompanied by an angular torque upon the respective shoes 51 and 52, causing them to move slightly in the line of the drum movement. This causes the inner and outer cams to shift their relative alignment, and to ride one set of rollers between the cams, while causing separation of the other ends of the cams away from the rollers. Energized frictional engagement with a substantial wedging action is thus secured. Release of the ring pressure, through removal of the cam pressure after the desired braking has been secured, causes the ring to move diametrically, assisted by the several springs 35, removing the pressure from the cam rollers, which tend to return by the action of the springs 45 and the compression of the spring 27 or 28, and 64, as should be quite clear.

Referring now to the preferred form of the invention as illustratively disclosed in Figs. 7 and 10, it will be noted that the plate 71, which is fixed and similar to the plate 13 of the first described form, may be substantially planar, and be provided merely with a fixed abutment 72, a fixed guide abutment 73, substantially diametrically opposite to abutment 72, and an elongated substantially radial slot 74 in line with the abutments and between the abutment 73 and the periphery of the plate, 75.

The brake unit arranged for quick and easy assembly and disassembly with the simplified plate disclosed comprises a ring 76 having outwardly directed peripheral flanges 77 and 78 defining an annular channel 80. The flanges are cut away in the center as at 81 to slidably engage the abutment 72, and a pair of parallel ears 82 are inwardly disposed rigidly on the ring to slidably engage the other fixed guide abutment 73. It will be evident that the ring has guided diametrical motion only, with a preclusion of angular motion. It will be clear that if desired the end of abutment 72 may removably receive a disc or washer 79 to overhang the side wall of the ring 76 in slidable engagement so as to maintain the plate aligned disposition of the ring and associated shoes to be described. Any other device or modification of the abutments for the purpose may also be resorted to as will be obvious.

The channel 80 of the ring 76 has the spaced parallel guiding lugs 83, preferably evenly spaced on each side of the internal guide ears 82, each substantially parallel to a tangent of the channel in the ring and each extending outwardly beyond the peripheries of the flanges 77 and 78, to support and guide a base brake shoe to be described. The channel 80 is also provided with the flattened surfaces 84 and 85, each also parallel to the tangential, preferably, and spaced from each other in one direction from their centers by perhaps 120°, and in the other by approximately 240°. Each flat surface is provided, by the spaced transverse semi-cylindrical members 86 and 87 fixed on the flat surface, formed preferably by the cylindrical pins extending between the flanges and partially into recesses in the flat surface, with bearing pivot elements, upon which rocking cams to be described may be disposed. Suitable wearing surfaces 88 may be provided in the channel 80, in juxtaposition to the guide ears 82, adjacent to which a semi-cylindrical slot 90 is formed to receive the bearing portion of a cam shaft 91, similar to shaft 14 already described, and carrying preferably the cams 92 and 93. Any suitable actuating means may be provided including any desired hydraulic gear (not shown), but preferably the shaft 91 is keyed removably to a crank 94, actuatable by the operator, so that they may be easily and quickly disconnected to facilitate removal of the braking unit as an entity without disassembly.

The base brake shoe 95 has a lining face 96 carrying lining 97, and has the arcuate spaced flanges 98 and 100 defining a channel 101. A wear plate 102 is in the brake shoe channel in juxtaposition to the cams on the cam shaft 91, and the wall or flange 100 is cut away to receive the bearing portion of the cam shaft in its semi-cylindrical contour, a complement of the similar recess or notch 90 of the ring which it confronts. The spaced parallel guide lugs or tongues 103 and 104 are complemental and similar in dimensions to the outwardly extending lugs 83 so as to mutually extend into the channel between the respective flanges on the relatively movable ring and base brake shoe, as will be clear. It will also be evident that the base brake shoe has no angular motion and is not susceptible to self-energization as are the floating shoes to be described.

Removably disposed in the channel 80 of the ring, upon the flat surfaces 84 and 85, and in engagement with the respective pivoting lugs 86 and 87 thereof, are the rocking cam elements 105 and 106. As these are identical the description will be directed to cam element 106. At the lower edge it has a rocking surface 107 and two notches or recesses 108 and 109 normally seated upon the transverse pins respectively 86 and 87. The cam elements are of such thickness as to have sliding engagement within the channel 80, while the ends 110 extend beyond the channel of the ring and into the channels of the respective floating shoes to be described, to assist in preventing side sway or play between the parts. The element has an obtusely angled face comprising the cheek 111 and cheek 112.

The floating shoes 113 and 114 are identical so that shoe 114 will be described. This comprises an arcuate lining face 115 carrying the brake lining 116, and the inwardly directed peripheral spaced flanges 117 and 118 defining a channel 120 complemental to and confronting channel 80 of the ring 76. It is preferred that the inner arcuate surface edges of the flanges 117 and 118 be formed on a radius somewhat larger than that upon which the confronting flanges 77 and 78 of the ring are formed, so that each shoe has its ends, respectively 121 and 122 somewhat spaced from the ring as contrasted with its central portion 123. The shoes are centrally provided in the channel with the obtusely angled fixed wedge element having divergent cam faces 124 and 125, and in the normal position of the parts the respective cam faces confront and are parallel to the juxtaposed cam faces of the rocking cam element 106, as will be clear.

In the normal centered position of the floating shoe relative to the ring the space between the respective cam surfaces will be the same on each side, and the group of rollers shown in Figs. 7 and 10 will be disposed in the equal spaces and in contact with both surfaces of the roller space. The roller group preferably comprises the rollers 126, 127 and 128, held together by any suitable common guide device, as 130. The two groups are preferably placed in the roller channels or grooves without being connected together as in the showing of Fig. 5, although this may be resorted to in the preferred form as well, if desired. At the end of the fixed obtuse angled cam or wedge elements in alignment with its respective surfaces 124 and 125, the shock or compression springs 131 and 132 are anchored, as by bolts 133, in position to be abutted or engaged and compressed by the rollers 126 or 128 in extreme movements of the parts, although normally these springs merely serve as retaining elements for the roller elements in series. The assembly of rollers can be cheaply and expeditiously accomplished by turning down the central portions to form hubs 137, and the coupling element 130 is drilled to form bearing surfaces to receive the hubs, and opened by means of a transverse or radial saw cut, adjacent to which the tips are bent open to receive the hub, and then bent back to anchor it in place.

The floating shoes are resiliently secured together by the tensioning spring 140 anchored by suitable pins 141 in the respective channels of the shoes. The pins may be arranged for removal if desired to separate the shoes and disassemble the unit. Similar tension springs 142 and 143 connected to the base shoe pins 144 in the channel 101, and extending beyond the ends of the base shoe extend into the ends of the channels of the adjacent floating shoes to anchorage therein, by pins 145. The action of the several compressing coil springs is to pull the shoes tightly against the ring, with the consequent holding in of all of the component elements.

It will be apparent that as the lining on the shoes becomes worn and thinner, any suitable adjustment devices may be availed of to take up for the wear, in accordance with the desires of the manufacturer of the equipment, and illustratively an adjustment is provided between the operating lever and the shank or cam shaft, whereby the relative angular relationships can be varied, and it is believed there will be no difficulty in appreciating this feature.

It will also be apparent that in all of the forms of the device illustrated the servo-shoes, in either direction of actuation are supported between the middle of the shoe and the toe thereof, as the rearmost rollers lose contact with the shoe as the front rollers engage tightly between the toe of the shoe and the ring, and as the rocking wedge tilts slightly about its pivots, as shown in Fig. 10, so that the support and point of thrust is relatively closer to the advancing end of the shoe than the heel, or trailing end. This results in the heel of the shoe being forced into frictional engagement with the drum only because of its attachment to the toe and by the resilience of the whole, so that upon cessation of braking pressure, and return of the ring to its substantially concentric position in the drum due to the tension of the several springs in the assembly, the tail of the shoes are easily pulled out of contact with the drum by the tension springs to unlock the energized floating shoes as the point of support on the fixed and rocking double cam roller surfaces of the respective forms of the invention shown, moves away from the drum to disengage the toe end of the floating shoes also. In other words the forward support point enables extreme braking pressures in self-energized shoes without the danger of "grabbing," or unlocked engagement.

I claim:

1. A brake assembly for association with a fixed supporting plate and a relatively rotatable drum, comprising an inner element, a plurality of brake shoes mounted movably on said element, resilient means connecting adjacent shoes for embracing relation to the element means joining the element and shoes for manipulation as a unit, and means for securing relative movement of the element and all of said shoes simultaneously for braking purposes.

2. A brake assembly for association with a fixed support and a relatively rotatable drum comprising a ring, a base brake shoe mounted on and movable radially of said ring, a plurality of floating brake shoes mounted on said ring, means resiliently securing all of the said shoes together to hold them against the ring, means for securing relative radial movement of the ring and the said base brake shoe and simultaneously motion of the ring relative to the floating shoes to urge the latter outwardly.

3. A brake comprising a moving drum, a ring, a brake shoe radially operably slidably disposed relative to the ring, a self-energizing brake shoe rockably operably disposed relative to said ring, means for supporting the ring in normally concentric disposition in the drum, means for moving the ring to a position of eccentricity in the drum wherein the said brake shoes are each moved into engagement with the drum.

4. A brake comprising a moving drum, a pair of brake shoes of which one is self-energizing, a ring normally concentric with the drum, means engaging between the ring and one shoe to simultaneously urge the ring to eccentricity relative to the drum and the said last mentioned shoe to engagement with said drum, means engaging between the ring and the other self-energizing shoe to urge it outwardly and angularly toward semi-wedged engagement with the drum.

5. A brake comprising a movable drum, a brake shoe normally out of engagement with the drum, a ring normally concentric with the drum, means for moving the ring to a position of eccentricity in the drum, a double wedge element mounted on the ring, a complemental double wedge element on the shoe, rollers between the opposing faces of the wedge elements arranged to permit limited rotational movement of the shoe on the wedge in either direction to establish self-energization thereof, and means for moving the shoe rotationally in the opposite direction pursuant to removal of the eccentricity of the ring.

6. A brake comprising a drum, a brake shoe, an obtusely angled abutment on the shoe, a double wedge element juxtaposed relative to the abutment to furnish a pair of relatively parallel angularly divergent surfaces, roller means between both pairs of surfaces, and means for moving the wedge element in a line parallel substantially to a radius of the drum, said shoe abutment being out of the radial line to which the movement is parallel.

7. A brake assembly comprising three resiliently joined brake shoes, and a rigid closed bodily shiftable embraced supporting actuating element, one of said shoes having bodily radial movement relative to the element, and the others being disposed for rocking and angular motion relative to said element.

8. A brake comprising an externally channeled ring element, a fixed support relative to which the ring has guided diametric movement, a plurality of shoes having internal channel elements and disposed with the elements in juxtaposition to the ring element, means guiding one shoe for radial movement on and relative to the ring, double wedge elements disposed in the channel of the ring, cooperating wedge elements in the confronting shoes, and rollers between the respective wedge surfaces.

9. A brake comprising an externally channeled ring element, a fixed support relative to which the ring has guided diametric movement, a plurality of shoes having internal channel elements and disposed with the elements in juxtaposition to the channel element of the ring, means guiding one shoe for substantial radial movement on and relative to the ring, double wedge elements pivotally mounted in the channel of the ring and arranged for limited rocking movement therein, cooperating wedge elements disposed in the respective juxtaposed confronting shoes, roller elements between the respective wedge surfaces.

10. A brake comprising an externally channeled ring element, a fixed support relative to which the ring has guided diametrical movement, a plurality of shoes having internal channel elements and disposed with the elements in juxtaposition to the channel element of the ring, means guiding one shoe for substantial radial movement on and relative to the ring, double wedge elements mounted in the channel of the ring, cooperating wedge elements disposed in the respective juxtaposed confronting shoes, one of said wedge elements being pivotally mounted for limited rocking, roller elements between the respective wedge surfaces, springs engaging between the ends of adjacent shoes to urge them resiliently toward the ring to form a portable assembly.

11. A brake comprising an externally channeled ring element, a fixed support relative to which the ring has guided diametrical movement, a plurality of shoes each having internal channel elements and disposed with the elements in confronting juxtaposition to the external channel of the ring and in peripheral substantial alignment, means guiding one shoe for substantial radial movement on and relative to the ring, double wedge elements mounted in the ring channel and extending into the channel of the juxtaposed shoe to minimize relative lateral movement of the shoes and ring, cooperating wedge elements mounted in the respective confronting shoe elements, rollers disposed between the respective spaced opposed wedge surfaces, one of said wedge elements being pivotally mounted for limited rocking, the channel elements of the wedge carrying shoes being arcuately formed on a radius greater than the external periphery of the ring channel to permit limited rocking of the shoes, resilient means urging the shoes toward the ring.

12. A brake comprising a fixed plate having a pair of diametrically spaced abutments, an externally channeled ring having guide surfaces arranged to engage the abutments to guide the ring for linear movement, a plurality of shoes of which one is secured to the ring for guided sliding motion relative thereto, the other shoes having internal channel members on a radius greater than the radius of the periphery of the ring channel, a wedge element mounted in the ring channel opposite each channeled shoe, a cooperating wedge element mounted substantially centrally of the shoe in its said channel and normally in substantially parallel spaced relation to the first mentioned wedge element, rollers engaged between the wedge surfaces, one of each pair of wedge elements being pivotally disposed for limited rocking to enable the shoes to have limited rocking relative to the ring, and resilient means urging the shoes toward the ring to form a detachable portable unit of the shoes and ring to facilitate lining of the shoes.

HENRY J. SMITH.